(12) United States Patent
Porter et al.

(10) Patent No.: US 6,745,013 B1
(45) Date of Patent: Jun. 1, 2004

(54) METHOD AND SYSTEM FOR CONTROLLING TRANSMIT POWER OF NETWORK NODES

(75) Inventors: John David Porter, Cambridge (GB); Walter Charles Vester, Philadelphia, PA (US)

(73) Assignee: Axxcelera Broadband Wireless, Santa Barbara, CA (US)

( * ) Notice: Subject to any disclaimer, the term of this patent is extended or adjusted under 35 U.S.C. 154(b) by 0 days.

(21) Appl. No.: 09/537,743

(22) Filed: Mar. 30, 2000

(30) Foreign Application Priority Data

Mar. 31, 1999 (GB) ................................................ 9907484

(51) Int. Cl.[7] ................................................ H04B 7/00
(52) U.S. Cl. ......................... 455/69; 455/513; 455/522
(58) Field of Search ........................... 455/68, 69, 522, 455/67.1, 403, 88, 513, 405, 407, 240, 13.1, 161.3, 277.2, 436, 437, 439; 370/318, 331, 332, 333

(56) References Cited

U.S. PATENT DOCUMENTS

| | | | | |
|---|---|---|---|---|
| 5,142,695 A | * | 8/1992 | Roberts et al. | ............. 455/437 |
| 5,487,180 A | | 1/1996 | Ohtake | |
| 5,564,075 A | | 10/1996 | Gourgue | |
| 5,590,409 A | * | 12/1996 | Sawahashi et al. | ........... 455/69 |
| 5,663,957 A | | 9/1997 | Dent | |
| 5,710,981 A | * | 1/1998 | Kim et al. | ................... 455/522 |
| 5,960,353 A | * | 9/1999 | Lee | ............................. 455/453 |
| 6,131,022 A | * | 10/2000 | Jacomb-Hood et al. | .. 455/276.1 |
| 6,289,009 B1 | * | 9/2001 | Sato | ............................ 370/342 |
| 6,418,320 B2 | * | 7/2002 | Yoshida et al. | ............. 455/522 |
| 6,490,460 B1 | * | 12/2002 | Soliman | ..................... 455/522 |

FOREIGN PATENT DOCUMENTS

| | | |
|---|---|---|
| GB | 2 268 365 A | 1/1994 |
| GB | 2 300 542 A | 11/1996 |
| GB | 2 314 486 A | 12/1997 |
| GB | 2 323 987 A | 10/1998 |
| WO | WO 97/07600 | 2/1997 |
| WO | WO 98/34356 | 8/1998 |
| WO | WO 98/45962 | 10/1998 |

* cited by examiner

Primary Examiner—Cong Van Tran
(74) Attorney, Agent, or Firm—Finnegan, Henderson, Farabow, Garrett & Dunner L.L.P.

(57) ABSTRACT

The transmit power of the subscriber terminals in a wireless network can be controlled by measuring the received power of a signal transmitted from an access point to a subscriber terminal at the subscriber terminal and then using the measured value as an index into a look-up table of transmit power attenuator settings. The use of a simple look-up table reduces the implementation complexity, since no complicated calculations must be performed to achieve effective power control.

16 Claims, 7 Drawing Sheets

TT  RF Turnaround Time

METHOD AND SYSTEM FOR CONTROLLING TRANSMIT POWER OF NETWORK NODES

TECHNICAL FIELD

The present invention relates to a method and system for controlling the transmission power of network nodes in a data communications network.

More particularly, the present invention relates to a method and system for controlling network node transmit power levels which can be integrated with a method or system for compensating for signal propagation delay, and which is of particular use in a data communications network where accurate power control and time synchronisation is required.

BACKGROUND OF THE INVENTION

Data networks can be classified in many ways, but for the purpose of the present invention, it is useful to classify them by their means of accessing the medium over which data is communicated. The relevant classifications are broadcast and non-broadcast An existing type of data network is Ethernet. Ethernet uses broadcast medium access. All network nodes sharing the network medium hear all traffic being passed over the medium. Traffic is directed to individual network nodes via physical layer addresses that are attached to the data packets being sent over the medium. When multiple network nodes attempt to transmit data simultaneously, there is the possibility for contention among the nodes for access to the medium.

A modification to the broadcast network is the broadcast network with hidden terminals. In this network, all terminals share the same medium, however it cannot be guaranteed that all terminals can hear each other. All that can be guaranteed is that all terminals can hear the central network node, referred to herein as the access point. For this reason, it is not enough for each terminal simply to monitor the channel in order to detect contentions. Feedback on success or failure of network contention must also be communicated back to the network terminals by the access point.

In contrast to the above, in a non-broadcast network, the medium that connects a network node to the rest of the network can only be accessed by two devices: the network node itself, and the network switch to which it is attached. The medium itself is fill duplex, so there is no possibility for contention.

A variation on the contention broadcast network is the time slotted network. In such a network fixed time slots are assigned to all nodes of the network, and the transmissions of each node are restricted to its particular assigned time slot. An example of such an arrangement of the prior art would be a Time Division Multiple Access (TDMA) network.

Such networks are often deployed in cellular configurations. In such configurations, each cell consists of a central access point and multiple subscriber terminals, and subscriber terminals communicate only to the central access point, making the network a point-multipoint architecture. A problem can arise due to the fact that as terminals may be located anywhere within the coverage area of the cell, then if each subscriber terminal transmitted with a fixed transmit power, the signals from each subscriber terminal would be received at the access point with varying power levels, due to the different free space path loss (FSPL) each signal would encounter. In order to overcome this problem, the access point receiver can use Automatic Gain Control (AGC) and a wide dynamic range receiver to receive each burst. However, this requires a long period of energy at the front of each upstream burst, used strictly for AGC loop stabilization therefore reducing channel efficiency. An alternative power control scheme is to use the access point receiver to measure the received signal strength from each subscriber terminal, then send a power control message to each network terminal to increase or decrease its power. However, this alternative scheme suffers from closed loop dynamics, plus reduces network bandwidth efficiency slightly. It also suffers from startup power control loop transients, since the first time the subscriber terminal transmits, it has not yet received any power control information.

SUMMARY OF THE INVENTION

The method and system of open loop power control of the present invention improves upon the above described schemes by using the following principle. In the present invention, the power level of the downstream burst arriving from the access point is measured and used to set the upstream transmit power of the network subscriber terminal before the subscriber terminal has ever first transmitted. The present invention is therefore open-loop, and does not suffer from closed loop dynamics.

According to the present invention, there is provided a method of transmission power control for use in a data communications network comprising a central control node and at least one remote subscriber node, said method comprising the steps of:

a) transmitting a first signal from the central control node to the remote subscriber node;

b) measuring a received power level of the first signal received at the remote subscriber node; and c) setting a transmit power level of the remote subscriber node in response to the received power level;

wherein the transmit power level of the remote subscriber node is set before the remote subscriber node has transmitted any signals onto the network, whereby said method is an open-loop method.

The method steps may be continuously repeated in order, allowing for the transmit power level of the subscriber node to be continuously controlled.

The first data portion may further contain a known data sequence, and this may be used to measure the received signal power.

The setting step may further contain the steps of using the received power level as an index into a look-up table of transmit power attenuator values; selecting the indexed attenuation value; and attenuating the transmit power level by the selected attenuation value.

All data traffic on the network may be regulated per unit time frame by the central control node.

The method of the present invention may be used in combination with any one of or a combination of a method of compensating for baseband delay or a method of compensating for signal propagation delay between network nodes.

From another aspect, the present invention further provides a system for controlling transmit power levels for use in a data communications network comprising a central control node and at least one remote subscriber node, said system comprising:

a) transmission means for transmitting a first signal from said central control node to said remote subscriber node;

b) measurement means for measuring a received power level of the first signal received at the remote subscriber node; and c) setting means for setting a transmit power level of the remote subscriber node in response to the received power level;

wherein the setting means set the transmit power level of the remote subscriber node before the remote subscriber node has transmitted any signal onto the network, whereby said system is an open-loop system.

Each of the system means may repeat their respective operations in order, allowing the transmit power level of the subscriber node to be continuously controlled.

The first signal may contain a known data sequence, and the signal power of the known data sequence is measured.

The setting means may further comprise: indexing means for using the received power level as an index into a look-up table of transmit power attenuator values; selection means for selecting the indexed power attenuator value from the look-up table; and attenuation means for attenuating the transmit power level by the selected attenuation value.

Any data traffic on the network may be regulated per unit time frame by the the central control node.

The system of the present invention may be used in combination with any one of or a combination of a system for compensating baseband delay or a system for compensating for signal propagation delay between network nodes.

It is an advantage of the present invention in that because it is not closed loop, the control method is instantly stable. Moreover, because the subscriber terminal measures the received signal power of a downstream burst before ever transmitting, there are no initial transients in the power control scheme. The first time the subscriber terminal transmits, it does so at the proper power level.

It is another advantage that the present invention measures the received signal power of a signal which would in any case be required for network signalling, thereby allowing power control to be achieved without adversely affecting bandwidth efficiency.

It is a further advantage that because the subscriber terminal measures the received power on each downstream burst, it is capable of tracking rapid changes in signal propagation.

In addition to the above, there is another advantage that the access point's tolerance of adjacent channel interferers is improved, since A/D dynamic range in the receiver is not spent on accommodating wide variations in received signal power.

Furthermore, since the network terminal dynamically tracks the signal propagation conditions, transmit power of the network terminal can be maintained at the minimum necessary for acceptable error rates at the access point. This enables efficient power usage at the network terminals, which enables battery powered terminals, and maximises battery life.

Finally, it is a feature of the present invention that power estimation may be done quickly enough to track dynamic fading channel conditions.

BRIEF DESCRIPTION OF THE DRAWINGS

Further features and advantages of the present invention will become readily apparent from the following detailed description of a particularly preferred embodiment thereof, in which.

DESCRIPTION OF THE PREFERRED EMBODIMENT

A specific implementation of the present invention will now be described.

Figure 1:
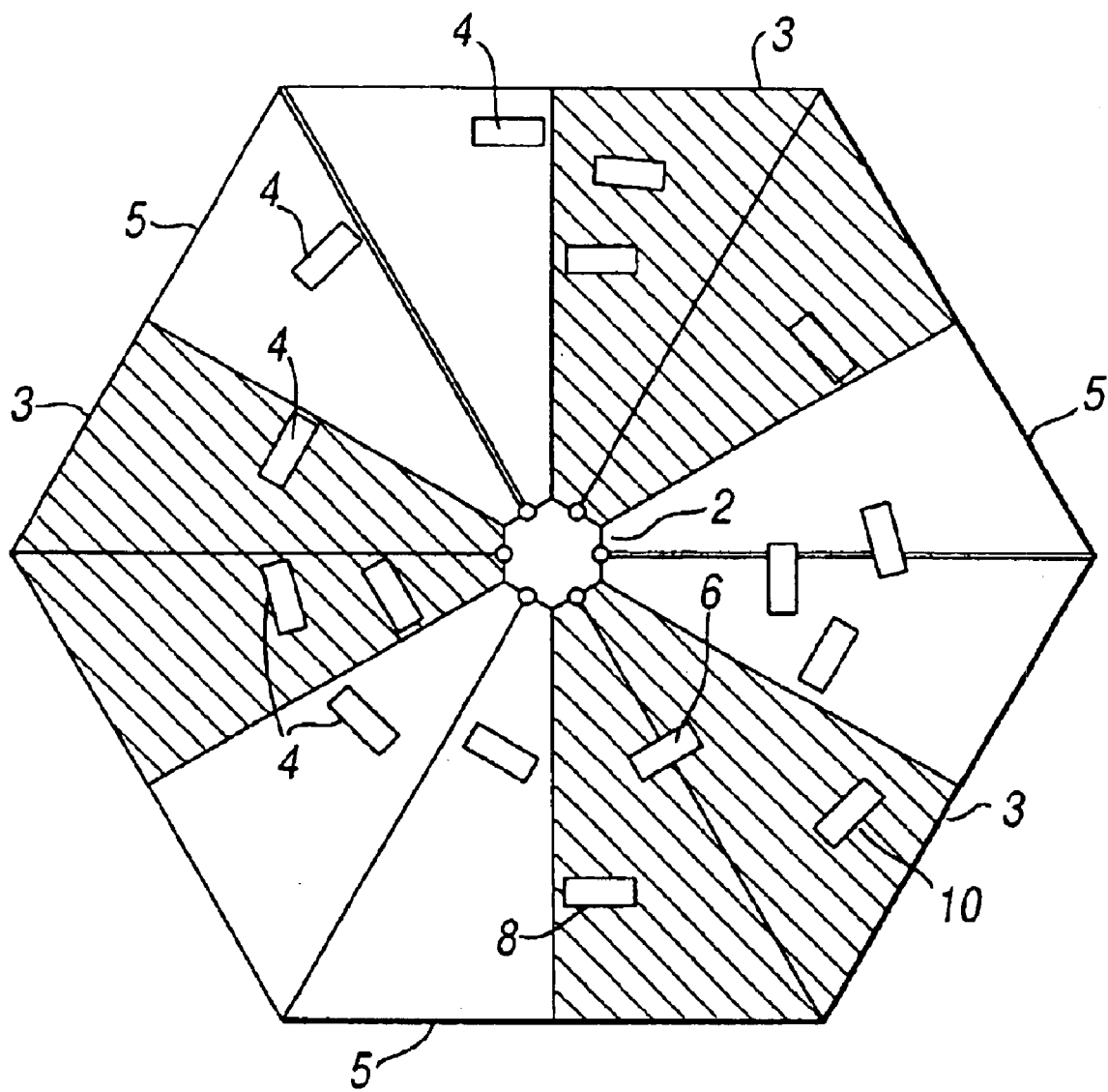
FIG. 1 shows a typical network deployment in which the method and system of the present invention may be used.

The method and system of the present invention are chiefly although not exclusively for use within a wireless access network deployed in a cellular configuration. Within the present particularly preferred embodiment to be described herein, each cell consists of a central access point and multiple subscriber units. Subscriber units communicate to the network only through the access points, making the network a point-multi point architecture. The access point is the centre of all wireless network communication for the particular cell, and thus is the locus of control of access to the wireless medium for the cell. A typical network deployment of this type is shown in FIG. 1.

Communication can occur on the wireless medium in both directions, and hence a means of duplexing the wireless medium is required. Two common methods are frequency division duplexing (FDD) and time division duplexing (TDD). In the case of FDD, the medium is broken into a downstream (data originating from the access point) frequency band and an upstream frequency band (data originating at the subscriber unit). TDD breaks a single frequency band into downstream time slots and upstream time slots. The network to which the present invention is applied uses TDD.

For the purpose of understanding the present invention, it is useful to view the network to which the invention is applied as consisting of multiple switches. On one end, corresponding to the access point, there is a switch with a single physical wired data port, and multiple wireless data ports. Disbursed throughout the cell are two port switches, each located at a subscriber terminal. Each subscriber terminal has a single wireless port and a single physical wired port.

In order to initiate communications over the network, a subscriber terminal must first register with an access point. During the registration process, a subscriber terminal negotiates with an access point to be assigned a temporary port identifier, referred to as a subscriber unit access identification (SU_AID). Once a subscriber terminal has been granted an SU_AID, it is capable of proceeding with higher layer signalling to gain access to the network medium.

Following registration, access of the subscriber terminals to the wireless medium is controlled through central control of the subscriber terminals by the access point. In order to achieve this the access point is provided with a medium access controller (MAC) which administers the medium control. Similarly, each remote subscriber terminal is also provided with a compatible medium access controller for responding to the central MAC in a master-slave manner: the subscriber terminals request access to the medium and the access point has the ability to grant access or fail to grant access based on the current level of network utilisation. Access to the network is granted in the form of time slots—when a subscriber terminal is granted the ability to access the wireless network medium, it is granted one or more time slots in which it can transmit. Within the granted time slot the entire medium capacity is available to the subscriber node to transmit its payload data. By referring to a medium access controller, it is to be understood that either a hardware or software based control means is envisaged and that reference to a controller as such implicitly includes reference to those control means required at both the central access point and at the subscriber terminals. In this respect, the medium access controller (MAC) therefore corresponds to those network means, whether hardware or software based, that would approximate to the Network-level and the Data-level of the ISO Open Systems Interconnection 7-layer Reference Model. As an example, a hardware based implementation of the MAC can be achieved using a Field Programmable Gate Array (FPGA).

The MAC operates by controlling transmissions on the medium by the definition of a MAC frame, being the framework in which data transmissions take place. In order to fully understand the various features and advantages of the present invention as applied to this implementation, it is necessary to first describe the constituent parts of a MAC frame, followed by a description of the various data structures used in the MAC. This will be performed by reference to FIGS. 2 through 4

Figure 2:
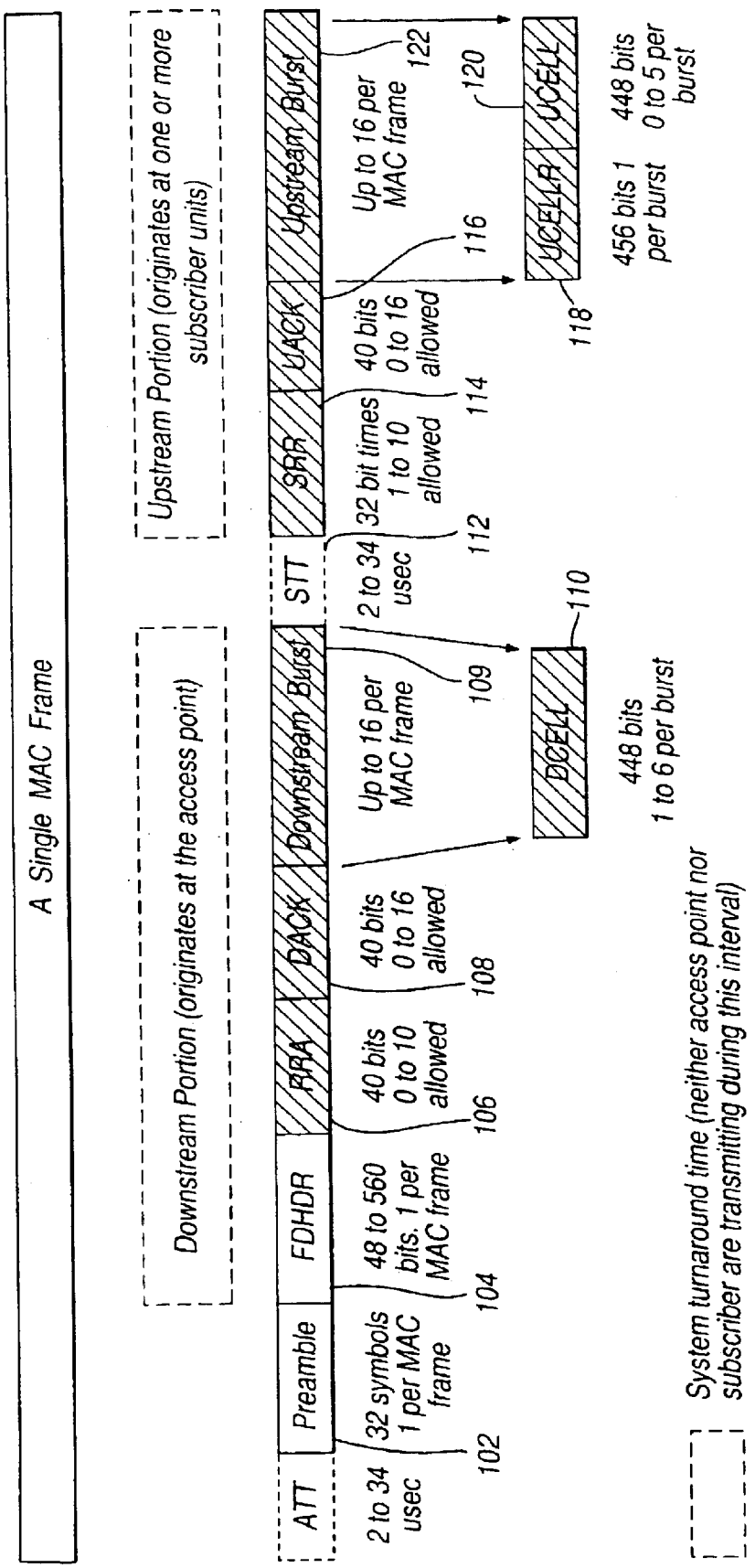
FIG. 2 shows a signal frame structure used in an implementation of the present invention.

FIG. 2 shows the overall structure of a single MAC frame. The MAC frame consists of a downstream portion, generated by the access point and broadcast to all subscriber terminals, and an upstream portion, which consists of a contention interval and all data bursts being sent from subscriber terminals back to the access point.

Figure 3:
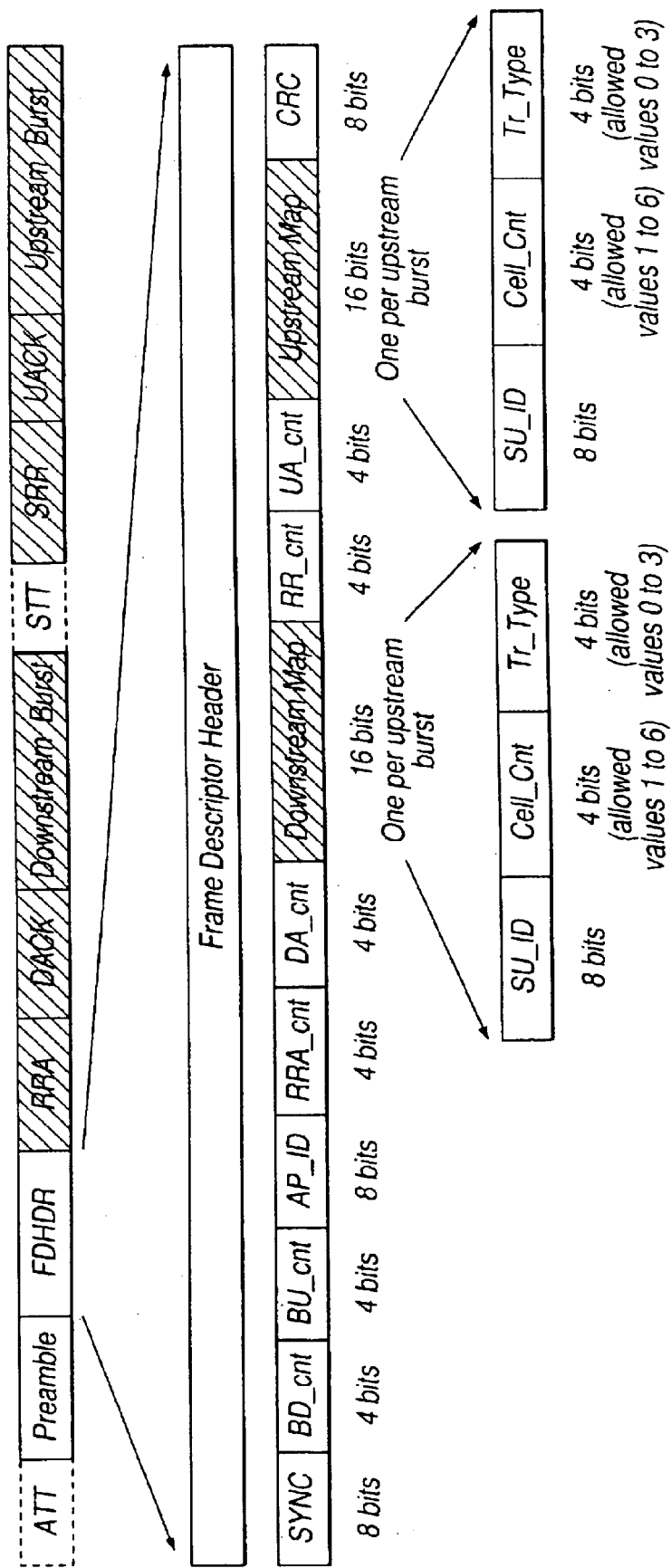
FIG. 3 shows the structure of a control data sub-frame used in the present invention.

The downstream portion consists first of a downstream preamble (102). The preamble is a Physical layer synchronization sequence of fixed length, used for frame acquisition and channel estimation. Only one downstream preamble may occur per MAC frame. The power control method of the present invention relies on the downstream preamble for measuring the received signal strength of transmissions from the access point. Immediately following the preamble is the frame descriptor header (FDHDR) (104). The FDHDR describes the complete contents of the remainder of the MAC frame. The size of the FDHDR may vary. The FDHDR contains a map of all traffic, upstream and downstream, to occur within the MAC frame. After achieving bit synchronisation on the MAC frame via the preamble, subscriber terminals demodulate the FDHDR and from that gain complete knowledge of the traffic that will occur within the remainder of the frame. Only one FDHDR may occur per MAC frame. The precise contents of the FDHDR are shown in FIG. 3 and described in detail in Table 1 below.

TABLE 1

Frame Descriptor Header (FDHDR) Structure

| Field Tag | Description |
| --- | --- |
| SYNC | Short 4 symbol sync burst. |
| BD_cnt | Bursts Downstream Count. Number of subscriber units having payload data sent to them in this MAC frame |
| BU_cnt | Bursts Upstream Count. Number of subscriber units that will be sending payload data in this MAC frame. |
| AP_ID | Access Point ID. Identifies the access point that originated the frame descriptor header. |
| RRA_cnt | Reservation Request Acknowledgment Count. Number of acknowledgments being sent in response previous requests. |
| DA_cnt | Downstream Acknowledgment Count. Number of upstream cell acknowledgements being sent downstream in this MAC frame. |
| Downstream Map | Identifies the subscriber unit being sent cells, the number of cells to be sent, and the traffic type being sent. |
| RR_cnt | Reservation Request count. Total number of reservation request slots that will be made available in this MAC frame. |
| UA_cnt | Upstream Acknowledgment count. Total number of downstream cell acknowledgments being sent upstream in this MAC frame. |
| Upstream Map | Identifies the subscriber units that have been granted reservations, the number of cells to be sent by each, and the traffic type allowed. |
| CRC | Cyclic Redundancy Check. Allows each subscriber terminal to verify correct receipt of the frame descriptor. |
| SU_ID | Subscriber Unit ID. Identifies the subscriber unit acting as the data source or sink in the burst. |
| Cell_Cnt | Cell Count. Total number of ATM cells to be sent in this particular burst. |
| Tr_type | Traffic Type. Defines the type of traffic that the subscriber unit is allowed to send or will be receiving during the current frame. |

Figure 4:
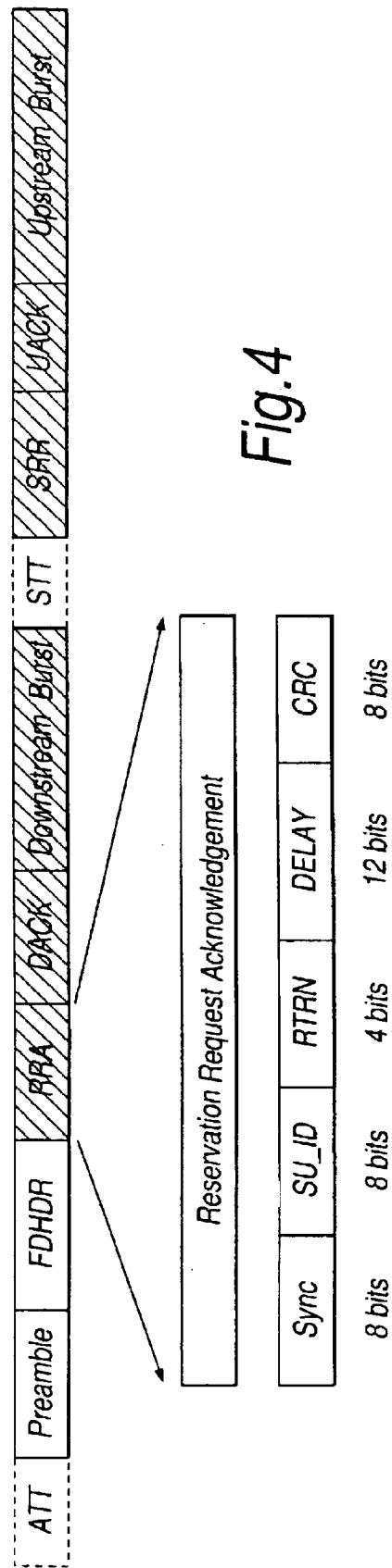
FIG. 4 illustrates the structure of another signal sub-frame used in the present invention.

Following the FDHDR is the reservation request acknowledgement (RRA) portion 106. The RRA acknowledges a request by a subscriber for upstream time slots and can also communicate signal propagation delay. There is a single RRA for each reservation request that was made during the contention interval from the previous MAC frame, although in the case where no reservation requests were made in the previous MAC frame, then no acknowledgements will be sent. The precise contents of the RRA are shown in FIG. 4 and described in detail in Table 2 below.

TABLE 2

Reservation Request Acknowledgement (RRA) Structure

| Field Tag | Description |
| --- | --- |
| Sync | 8 bit framing synchronization sequence |
| SU_ID | ID of the subscriber unit that originated the reservation request, and to which the reservation request acknowledgment is directed. |
| RTRN | Return Code. Communicates reservation status to SUs and SU_AID status to SUs performing registration. |
| DELAY | Delay compensation bits. These bits are assigned during subscriber unit registration and cause a shift in subscriber unit timing. |
| CRC | Cyclic Redundancy Code. Used by the subscriber unit to verify that the frame has been received error free. |

The DELAY field is particularly pertinent to the method of propagation delay compensation, as described later.

Following the RRA comes the Downstream Acknowledgement (DACK) portion 108 containing DACK cells. Each DACK cell contains a downstream ack or nack of a single upstream burst from a previous MAC frame. There is a single DACK cell for each upstream burst from the previous MAC frame, although in the event that there were no previous upstream bursts then no DACKs will be sent.

Following the DACK portion comes the Downstream Burst (109). The MAC operates on a principle of cell bursts for communicating payload data between the access point and the subscriber terminals by allowing multiple cells of data to be sent to or from a particular subscriber unit at a time. A burst must always consist of at least one cell. In upstream bursts, this single cell must be an upstream cell with reservation request (UCELLR) (118). Additional cells in the upstream burst are in the format of a UCELL—an upstream cell without reservation request (120). Upstream cells are discussed in more detail later. Downstream bursts can also consist of multiple cells, but there is only one type—the downstream cell (DCELL) 100. There can be many DCELLs—either several directed to a single subscriber terminal, or several directed to several subscriber terminals. Each DCELL contains one ATM cell of payload data. Currently the MAC allows bursts to have a maximum size of six cells, although more or less cells may be designated per burst if required in a future implementation without departing from the scope of the present invention.

The downstream burst concludes the downstream portion transmitted by the access point and received at all subscriber terminals. There then follows a slight delay due to subscriber turnaround time (STT) 112. The STT varies with distance to the farthest subscriber unit. A typical maximum distance to a subscriber unit could be, for example, 5 km, although this obviously depends on the network configuration and the size of each network cell. Minimisation of the STT will be discussed later.

Following the STT comes the Upstream Portion of the MAC frame, being data transmitted from the subscriber units to the access point. The entire expected structure of the upstream portion has already been communicated to each and every subscriber terminal in the FDHDR transmitted in the downstream portion. Therefore, each subscriber terminal knows whether or not it is permitted to transmit in the upstream portion, what data it is to transmit, and when it is to transmit this data. In this way absolute control of the contents of the upstream portion can be controlled by the access point. With such a mechanism, however, it becomes necessary to define a period in which subscriber terminals can first communicate a request for transmission permission to the access point, without which no subsequent permission would ever be granted. This period forms the first part of the upstream portion, being the subscriber reservation request (SRR) portion 114.

The SRR is a contention based reservation request interval. If a subscriber terminal has been sitting idle with empty data queues, the arrival of a burst of data on its physical port will force it to request a time slot reservation from the access point. Because the subscriber terminal has no active reservations, and because it is believed that at any given time the number of terminals making initial bandwidth requests will be small, it is reasonable to force the subscriber terminals to contend for reservations. This contention window is kept as small as possible while still allowing reasonable success probability by employing a novel implementation of aloha contention control schemes. Once the subscriber terminal's reservation request has been acknowledged by the access point, the subscriber terminal ceases requesting bandwidth in the contention slots, allowing other terminals access to the contention interval. The number of SRR's that may occur in one MAC frame is communicated to the subscriber terminals in the FDHDR. Multiple slots can be made available during times of heavy request traffic. Furthermore, the start of the contention interval can be calculated by the subscriber terminals by virtue of the FDHDR indicating to each terminal the number of RRAs, DACKs and the structure of the downstream burst in the subsequent downstream portion of the MAC frame. The contention interval then begins immediately after the end of the downstream burst, allowing for the STT.

Following the contention interval comes the upstream acknowledgement portion 116, containing upstream acknowledgement (UACK) cells of each downstream burst received during the downstream portion. Each UACK indicates upstream ack or nack of a single downstream burst from a previous MAC frame. As many UACKs may be transmitted in each upstream acknowledgement portion as there were downstream bursts in the downstream portion.

Following the upstream acknowledgement portion comes the upstream burst portion 122, containing cell bursts from subscriber units which were granted permission in the FDHDR to transmit payload data to the access point. The FDHDR from the downstream portion contains the instructions to the subscriber terminals on when to transmit a burst in the upstream burst portion, and what the burst is expected to contain. Each upstream burst contains one or more data cells with the same traffic type being sent from a particular subscriber terminal. Each upstream burst made in the upstream burst portion may be from a different subscriber unit, or alternatively may be from the same subscriber unit, depending upon the channel allocations granted to the subscriber units. In this way channel allocations can be dynamically assigned between the subscriber terminals from MAC frame to MAC frame, depending on the network traffic loading and the traffic priority. As mentioned earlier, each upstream burst must contain a single upstream cell with reservation request (UCELLR) 118, and zero or more upstream cells without reservation request (UCELL) 120. The condition that a burst must contain a UCELLR allows a subscriber terminal to maintain its channel reservation until all of its payload data has been sent, thus meaning that the subscriber terminal need not transmit again during the contention interval to request channel allocation to transmit the remainder of its data. This combination of the reservation maintenance request and the upstream cell into one message allows a single downstream acknowledgement to serve as both reservation maintenance request acknowledgement and payload cell acknowledgement, thus improving bandwidth efficiency.

Having described the full contents of the MAC frame, the open-loop transmission power control method and system of the present invention will now be more fully described.

As stated before, the sync burst of the MAC frame (the PREAMBLE) is used for open loop power control. The network terminal measures the total energy of the downstream burst, then uses it as an index into a look-up table of transmit power attenuator settings. The indexed value in the look-up table is selected, and the transmitted power is attenuated by that value by the transmission circuitry. By doing so, the network terminal is able to make the received signal strength of the upstream bursts, as seen by the access point, match to within 3 dB of the received signal strength of the downstream bursts as seen at the subscriber terminal. When the subscriber terminal is not actively transmitting, it is searching the channel for the downstream synchronization burst of the MAC frame. Therefore the subscriber terminal is constantly monitoring the channel and thus is always able to transmit at the proper power level. Furthermore, as the downstream bursts occur faster than the fading rate of the channel, power control may be performed fast enough to track dynamic fading channel conditions. Because this scheme uses a simple look-up table, it is easy to implement in a high speed network, and provides the numerous advantages listed earlier.

Moreover, the use of the simple look-up table within the present invention presents a number of further important advantages. More particularly, often the circuit elements used to control transmit power are not linear, and have an unknown power change relative to the applied control voltage. Use of the look-up table allows us to achieve nearly linear power control over the operational range of the power control device. This is done by learning the contents of the values required to be stored in the look-up table during a calibration period. This also reduces the implementation complexity, since no complicated calculations or linearizing circuits must be used to linearize the power amplification stages of the subscriber terminal or base station.

A method and system for compensating for signal propagation delay between network nodes will now be described, which can be integrated with the method and system of the present invention.

The distribution of subscriber terminals throughout the cell can cause a further problem to that already discussed above. The problem arises due to the fact that as terminals may be located anywhere within the coverage area of the cell, upstream bursts from the terminals may be offset by an unknown amount of time and will arrive at the access point at an unknown signal power level. In this situation, a guard time equal to twice the maximum propagation time over the cell radius must separate each burst, since the network has no knowledge from where in space each burst will originate. The problem will be illustrated further with reference to FIGS. 1 and 5.

Figure 5:
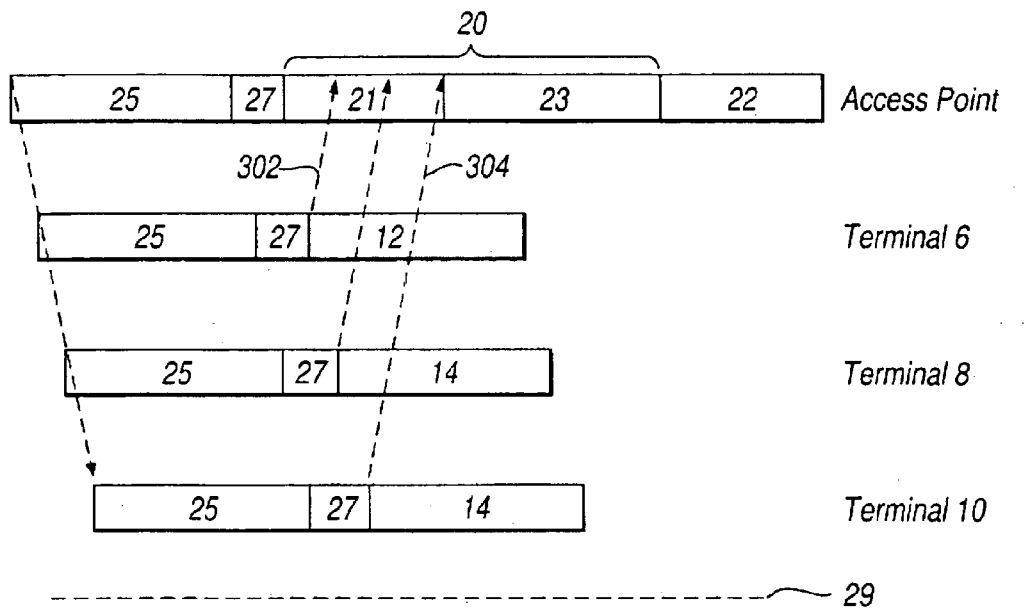
FIG. 5 demonstrates network operation without propagation delay compensation.

Within FIG. 1, a central access point 2 provides access to a wide area network (not shown) for a number of subscriber terminals 4. The subscriber terminals may be scattered throughout the access point cell coverage area. The cell coverage area may further be split into sectors 3 and 5 wherein each sector is covered by a different frequency. Now consider one sector containing subscriber terminals 6, 8, and 10, each respectively further from the access point than the last. With reference to FIG. 5, it is apparent that each particular upstream burst slot 20 must have allotted an amount of time corresponding to the sum of a guard time 21 and a burst time 23. The first upstream burst slot 20 follows immediately from the downstream burst 25, allowing for RF turnaround time 27. As the access point does not know how far away the terminal which has been allotted that particular upstream burst slot is, the guard time must be provided to allow for the maximum signal propagation delay across the cell. For example, if burst slot 20 has been allotted to terminal 6, then the burst 14 from terminal 6 begins to arrive only a little after the start of the guard time as shown by the arrow 302. However, if the burst slot 20 is allotted to terminal 10, then the signal propagation delay from terminal 10 to the access point causes the upstream burst 18 from terminal 10 to begin to arrive at the end of the guard time, as shown by the arrow 304. Where the subsequent burst slot is then allotted to a different terminal (e.g. terminal 6), there is the possibility that signals from the first burst slot (i.e. from terminal 10) and the subsequent burst slot (i.e. from terminal 6) could arrive at the access point concurrently, thus corrupting each signal. In order to avoid this, guard times (22) must be provided between burst. This clearly reduces overall transmission efficiency, as a significant portion of each upstream burst slot must be vacant.

The method and system to be described overcomes this problem by providing a method and system which compensates for the differences in signal propagation delay by causing each subscriber terminal to artificially simulate being at the same distance from the access point as every other subscriber terminal. This eliminates the need for guard times between each subsequent slot, as the propagation delays are simply forced to be the same for every subsequent transmission. In this manner, only one guard time is required at the start of the very first upstream burst slot to allow for the very first propagation delay. Subsequent burst slots then do not require guard times as the delay is always the same. The removal of the requirement for guard times means that channel efficiency is improved.

The method and system have the advantage that time delay compensation is achieved without using any additional network bandwidth. The control loop is also open, and as such has no unwanted dynamics or transients.

There is a further advantage in that the method of time delay compensation maximizes the network's bandwidth efficiency, since the guard times between upstream bursts can be eliminated.

Figure 7:
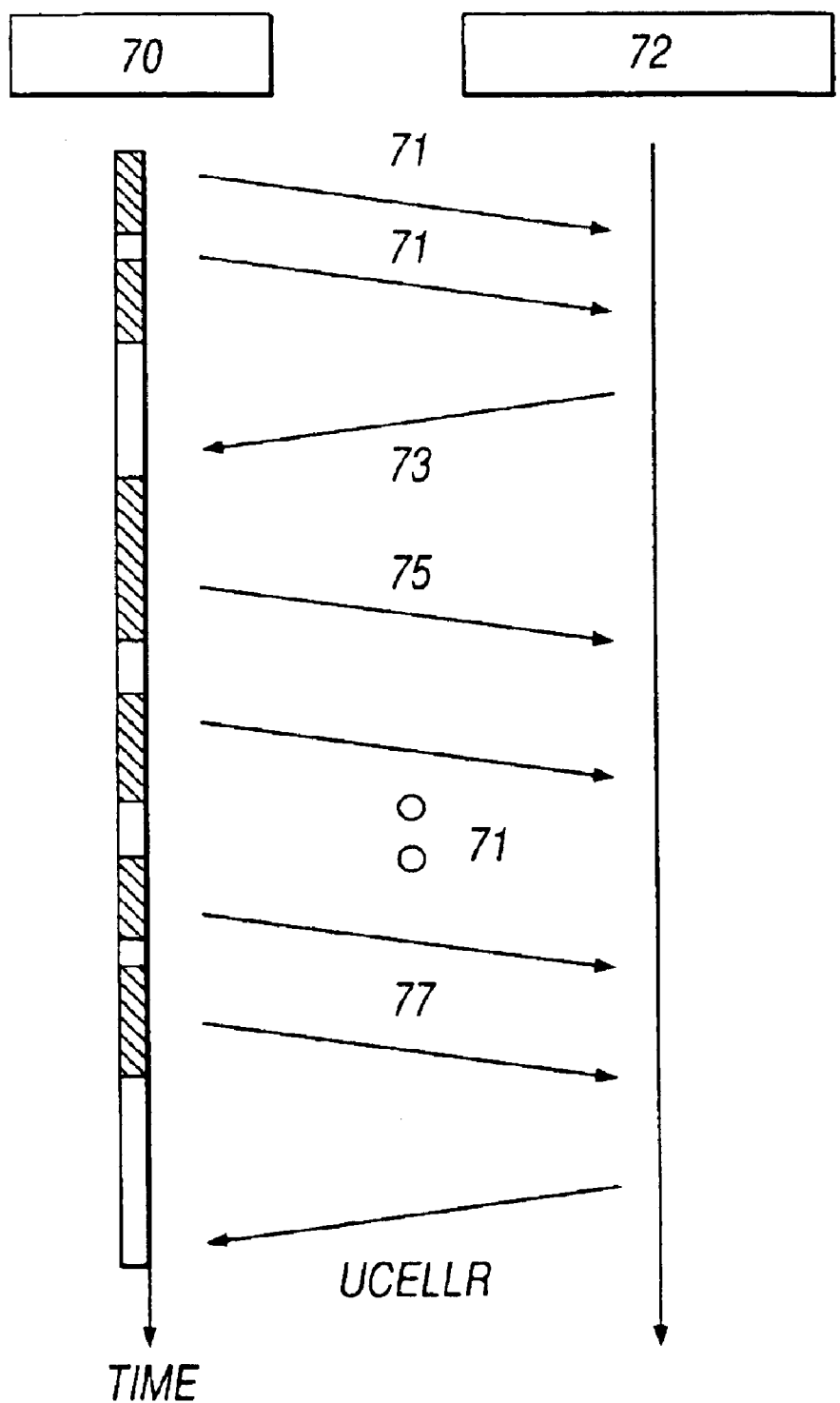
FIG. 7 illustrates the sequence of messages used in the signal propagation delay method and system.

FIG. 7 illustrates the sequence of messages passed between the access point (70) and a particular subscriber terminal (72) during network terminal registration, which is the period in which both power control and delay compensation are performed. The shaded elements on the time axis refer to periods during which a downstream burst is being broadcast from the Access Point. At the front of the downstream portion of the MAC frame is the frame synchronization burst (the PREAMBLE). The access point transmits the downstream portion (71) of the MAC frame periodically, even when there is no traffic to be sent within the network. When the network terminal is first powered on, it searches for this burst. The subscriber terminal uses the preamble of the downstream burst to synchronise with the burst, and then receives and de-modulates the FDHDR to locate the upstream contention interval. The method of open-loop power control of the present invention is then performed, to ensure that all subsequent signals are transmitted back to the access point at a suitable power level so as not to saturate the access point's receiver, nor at such a low power level that the bit error rate is unacceptable. Following power control, the terminal transmits back a bandwidth reservation request (73) for network bandwidth within the contention window of the upstream portion of the current frame.

This first reservation request 73 transmitted by the subscriber terminal will be compensated in power level but uncompensated in time delay. The access point MAC starts a countdown timer at the beginning of the contention interval, whose purpose is to measure the amount of compensation needed by any subscriber terminal that may transmit within the contention interval. When the subscriber terminal's transmission 73 arrives, the compensation value is taken directly from the countdown timer and placed in the DELAY field of the reservation request acknowledgement 75 sent back to the terminal.

Figure 6:
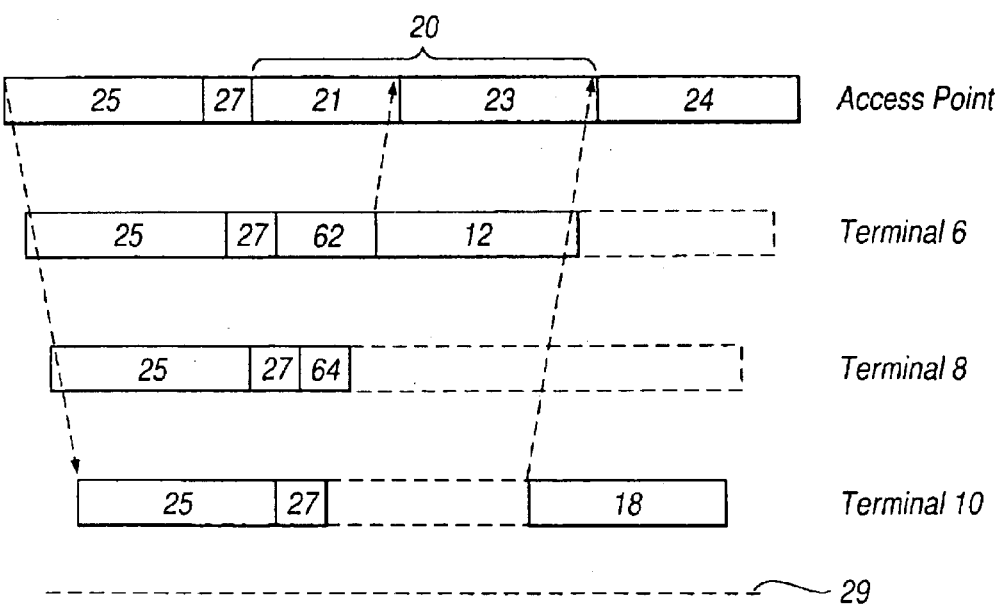
FIG. 6 demonstrates the operation of a signal propagation delay method and system.

The terminal receives the RRA and reads the delay value from the DELAY field. The terminal then continues to monitor the downstream bursts (71). Some time later, the access point sends the terminal a reservation grant (77) by including the terminal's SU_AID in the upstream burst map of the FDHDR. The terminal therefore now knows that it is permitted to transmit in the upstream burst of the present MAC frame. However, when doing so the subscriber terminal now delays its transmission by the measured value previously communicated to it in the DELAY field, so that the burst arrives at the access point aligned in time with other upstream bursts. FIG. 6 illustrates how the various delays achieve time alignment.

With reference to FIG. 6, it will be seen that following a downstream burst 25 and RF turnaround time 27, a first time slot 20 is defined which consists of a single guard time 21 and a upstream burst slot 23. A second upstream burst slot 24 then immediately follows the slot 23, with no guard time in between. In order for respective upstream bursts 12 and 18 from subscriber terminals 6 and 10 (c.f FIG. 1) to arrive at the access point in consecutive time alignment with the allotted upstream burst slots, each subscriber terminal must apply a single delay to its transmission corresponding to its respective measured delay value. An example with reference to FIG. 6 will make this clearer.

In FIG. 6, assume that the terminal 6 has been allocated the first upstream burst slot 23, and terminal 10 has been allocated the second upstream burst slot 24. As terminal 6 is relatively close to the access point, the propagation delay from the terminal to the access point is small and hence a large delay 62 is applied before transmission to cause the upstream burst 12 to arrive at the access point at the end of the guard time 21 and hence in time-alignment with the first burst slot 23. If the first burst slot 23 had been assigned to terminal 8, then a smaller delay 4 would have been applied before transmission, as the terminal 8 is further from the access point than terminal 6. If the first burst slot 23 had been assigned to the terminal 10 located near the cell edge 29, then no delay would be applied, as the propagation delay from terminal 10 to the AP is equal to the guard time 21.

Now consider the upstream burst 18 from terminal 10, which has been allocated the second upstream burst slot 24. Terminal 10 must transmit the burst 18 at an appropriate time to arrive at the AP precisely after the upstream burst 12 has arrived from terminal 6. Now, recalling that each terminal in the network has full knowledge of all the upstream cell bursts to be transmitted from every other terminal in the cell during the present MAC frame, terminal 10 will know the duration of the preceding burst slot 23 for terminal 6, and hence will be able to transmit its own upstream burst 18 at the appropriate time to arrive at the AP at the start of the slot 24. As terminal 10 is on the cell edge, it does not apply any delay prior to measuring the preceding slot 23 and transmitting its own burst 18 to arrive in time-alignment with slot 24. If, for example, terminal 8 had been allocated slot 24, then the delay 64 would have been applied before starting to measure the preceding slot 23 and the subsequent transmission of its own burst 14. Similarly, terminal 6 would apply the delay 62 in the same manner. In this way precise time alignment can be achieved from burst to burst, whilst allowing for the differences in signal propagation delay between each terminal and the access point.

It will thus be apparent that only one delay need be applied per MAC frame for each subsequent upstream burst in the upstream portion of the present MAC frame to arrive at the AP in time-alignment with their respective allocated slots. The respective delays for each terminal must always be applied at the very start of each overall upstream burst portion 122 (c.f FIG. 2) in each MAC frame.

The delay compensation scheme as described herein presents very little network overhead. Since the network terminal must pass the bandwidth request to the network terminal anyway, the delay compensation scheme is implemented using very little additional bandwidth. The only additional bandwidth required is the DELAY field of the reservation request acknowledgement downstream burst.

A method and system for compensating for baseband delay in any of the network nodes will now be described. This method and system may be used in combination with either or both of the above described methods and systems.

Channel utilisation can be improved by reducing the turnaround time between receipt of a signal at a network terminal and subsequent transmission of a second signal from the terminal. The turnaround time is dominated by the propagation of time of baseband signals through the transmit path of the network terminal's modem. By using a bi-directional signal path within the modem then turnaround time can be minimised.

Figure 8:
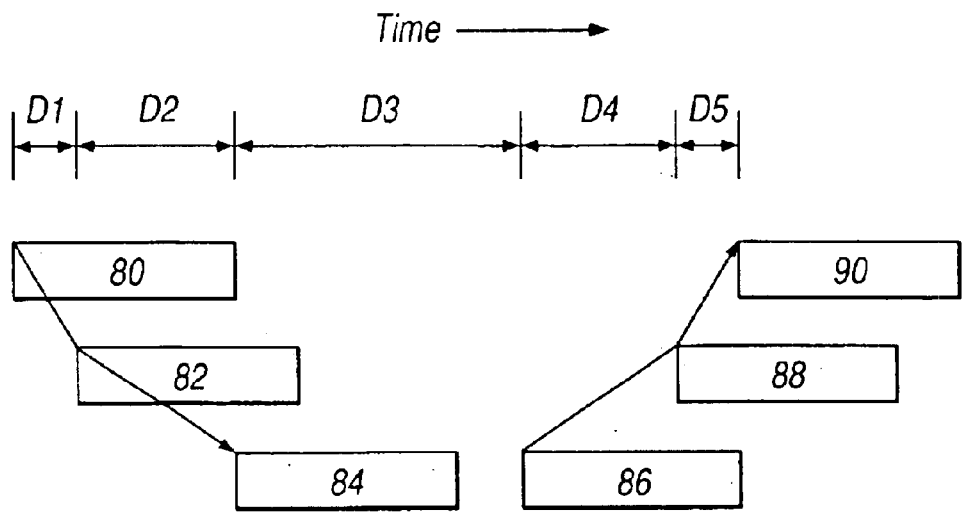
FIG. 8 shows network terminal operation without baseband delay compensation.

FIG. 8 shows the time sequence of bursts in a network terminal that does not use baseband delay compensation. Here the downstream burst (80) is received at the antenna and takes some time propagating through the RF hardware before arriving at the modem. This is the source of delay D1. Then the signal is processed by the modem (82), which is the source of delay D2. When the symbols appear at the MAC (84), it processes them and assembles an upstream burst (86). This MAC processing time is the source of delay D3. Once the symbols comprising the upstream burst have been assembled, they are passed through the transmit path of the modem (88), which is the source of delay D4. Finally, there is propagation time through the transmit RF path (90), which is the source of delay D5.

The method of baseband delay compensation described herein is as follows.

As mentioned earlier, the downstream portion of the MAC frame includes the frame descriptor header, which describes completely the contents of the entire MAC frame. Each network terminal that demodulates the frame map knows where and when in the upstream burst it must transmit its burst. As such, it is possible for each network terminal to prepare its upstream bursts in advance of the time at which they are to go over the air.

Signal propagation time through the transmit portion of the modem is dominated by delay through the FIR pulse shaping filter. By using a separate transmit and receive path through the network terminal modem and sending the transmit symbols through the modem early, it is possible to have filtered baseband signal present at the RF modulator input precisely at the time the transmitter has stabilized.

Figure 9:
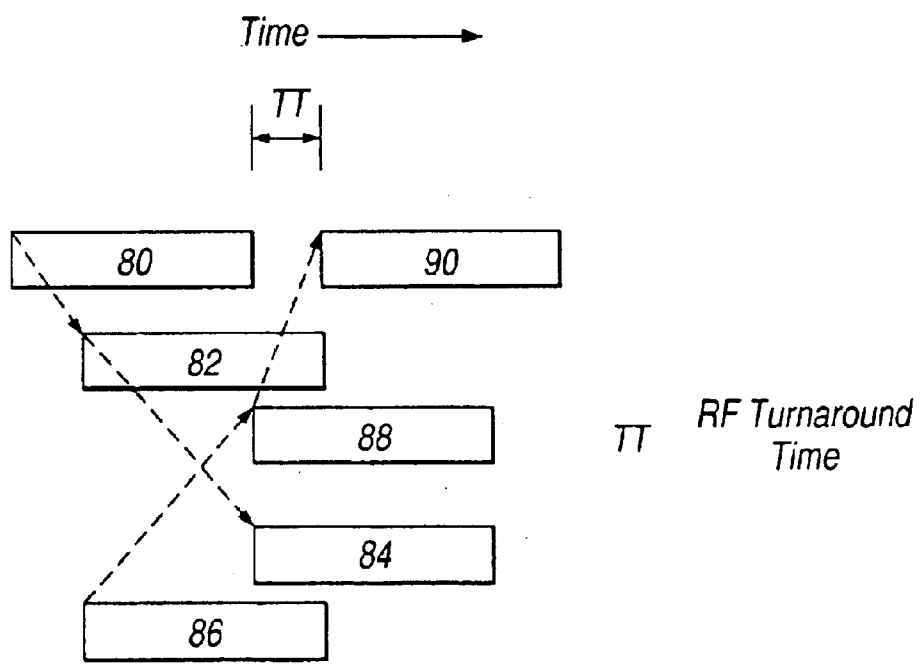
FIG. 9 illustrates network terminal operation with baseband delay compensation.

FIG. 9 demonstrates the operation of a network terminal using such compensation. The same reference numerals as in FIG. 8 are used to demonstrate the order and timing in which the identical operations of FIG. 8 are performed using the present method of baseband compensation. With reference to FIG. 9, the upstream burst is assembled (86) before the complete downstream burst has arrived at the MAC (84). This is possible because the network terminal has received a frame descriptor header, which has informed the network terminal far in advance exactly what to transmit and when. The network terminal starts the upstream burst through the transmit processing chain far enough in advance so that it passes through the RF portion (90) of the terminal just at the time the RF portion has stabilized in switching from receive to transmit operation. This allows the network terminal to operate with the minimum turnaround delay time of TT, equal to the receive-to-transmit switching time of the RF portion.

The method and system of the present invention may be integrally used with either or both of the above described methods of baseband delay compensation or signal propagation delay compensation.

What is claimed is:

1. An open loop method of transmission power control for use in a data communications network comprising a central control node and at least one remote subscriber node, said method comprising the steps of:
   a) transmitting a first signal from the central control node to the remote subscriber node;
   b) measuring a received power level of the first signal received at the remote subscriber node; and
   c) setting a transmit power level of the remote subscriber node in response to the received power level;
   wherein the setting step c), further comprises the steps of:
      i) using the received power level as an index into the look-up table of transmit power attenuator values;
      ii) selecting the indexed attenuation value; and
      iii) attenuating the transmit power level by the selected attenuation value; and
   wherein the transmit power level of the remote subscriber node is set before the remote subscriber node has transmitted any signals onto the network.

2. A method according to claim 1, wherein the transmit power is attenuated at the attenuating step iii) such that the transmit power is of such a level whereby a life of a battery powering the remote subscriber node is maximized whilst simultaneously ensuring that data may be transmitted by the remote subscriber node with at least a certain bit error rate.

3. A method according to claim 1 wherein the network is a wireless network.

4. A method according to claim 1 wherein data traffic on the network is regulated per unit time frame by the central control node.

5. A method according to claim 1, further including compensating for signal propagation delay between network nodes.

6. A method according to claim 1, further including performing baseband delay compensation.

7. An open loop system for controlling transmit power levels for use in a data communications network comprising a central control node and at least one remote subscriber node, said system comprising:
   a) transmission means for transmitting a first signal from said central control node to said remote subscriber node;
   b) measurement means for measuring a received power level of the first signal received at the remote subscribe node; and
   c) setting means for setting a transmit power level of the remote subscriber node in response to the received power level comprising:
      i) indexing means for using the received power level as an index into the look-up table of transmit power attenuator values;
      ii) selection means for selecting the indexed power attenuator value from the look-up table; and
      iii) attenuation means for attenuating the transmit power level by the selected attenuation value; and
   wherein the setting means set the transmit power level of the remote subscriber node before the remote subscriber node has transmitted any signal onto the network.

8. A system according to claim 7, wherein the attenuation means attenuate the transmit power such that the transmit power is of such a level whereby a life of a battery powering the remote subscriber node is maximized whilst simultaneously ensuring that data may be transmitted by the remote subscriber node with at least a certain bit error rate.

9. A system according to claim 7, wherein the network is a wireless network.

10. A system according to claim 7, wherein data traffic on the network is regulated per unit time frame by the central control node.

11. A system according to claim 7, in combination with a system for compensating for signal propagation delay between network nodes.

12. A system according to claim 7, in combination with a system for compensating for baseband delay.

13. A method according to claim 1 wherein the steps a), b) and c) are continuously repeated in order, whereby the transmit power level of the remote subscriber node may be continuously controlled.

14. A method according to claim 1, wherein the first signal contains a known data sequence, and the measuring step b) measures the received power level of the known data sequence.

15. A system according to claim 7, wherein the transmission means, measurement means and setting means each continuously repeat their operations in order, whereby the transmit power level of the remote subscriber node may be continuously controlled.

16. A system according to claim 7, wherein the first signal contains a known data sequence and the measurement means measure the received power level of the known data sequence.

* * * * *

UNITED STATES PATENT AND TRADEMARK OFFICE
CERTIFICATE OF CORRECTION

PATENT NO. : 6,745,013 B1
DATED : June 1, 2004
INVENTOR(S) : John David Porter et al.

It is certified that error appears in the above-identified patent and that said Letters Patent is hereby corrected as shown below:

Title page,
Item [75], Inventors, "Cambridge" should read -- Great Shelford --.

Column 13,
Line 46, "remote subscribe" should read -- remote subscriber --.

Signed and Sealed this

Twenty-eighth Day of September, 2004

JON W. DUDAS
*Director of the United States Patent and Trademark Office*